United States Patent Office 3,295,987
Patented Jan. 3, 1967

3,295,987
METHOD OF PRODUCING ALCOHOLIC MALT BEVERAGE
Kazuo Hoshino, Tokyo, and Toshitada Fukaya and Mikio Kato, Ibaragi-ken, Japan, assignors to Kyowa Hakko Kogyo Co., Ltd., Tokyo, Japan, a corporation of Japan
No Drawing. Filed May 20, 1963, Ser. No. 281,758
Claims priority, application Japan, Aug. 21, 1962, 37/34,463
8 Claims. (Cl. 99—31)

The present invention relates to a method of producing alcoholic malt beverage, wherein malt and protein are used in the mashing process. More particularly, the invention has especial relation to the production of a beer and a beer-like alcoholic malt beverage, wherein malt and protein are the raw materials and wherein starch is also employed.

There are many known methods for the production of alcoholic malt beverages; however, the present method is characterized by the production of such a beverage having a special taste, by using plant proteins and proteolytic enzymes. A variety of beverages can be produced by the present process, depending upon whether purified or unpurified plant proteins are employed in the mashing process.

According to the present invention, the plant protein is separately treated with proteolytic enzyme to produce peptide, amino acid and other products, as one mash, while malt, rice and/or starch are cooked and hydrolyzed in a second essentially conventional mashing step. The two mashes thus obtained are mixed and again boiled. This time with the addition of hops. After boiling, the mixture is pumped through a hop strainer and so-called wort is obtained.

Alternatively, the following mashing procedure may also be followed. The plant protein, rice and/or starch are mixed in water and the mixture is boiled. After the mixture assumes a paste form, a small part of the malt and proteolytic enzyme are added to liquefy the mash and to hydrolyze the protein. Saccharified solution is then obtained by the addition of the main part of the malt, following the hydrolysis. Moreover, liquefaction, hydrolysis and saccharification can be carried out without proteolytic enzyme when a large quantity of malt is used. The liquefaction, hydrolysis and saccharification are effected at appropriatae temperatures respectively, and the mash is boiled with a small quantity of hops to obtain aroma. In this way, wort is obtained.

In either procedure, after the wort has been cooled to appropriate temperature, it is subjected to fermentation by inoculation with yeast of the bottom fermentation type. The fermentation is carried out by bottom fermentation, consisting of two stages: a primary fermentation stage and a secondary fermentation stage. The latter stage, wherein carbon dioxide is dissolved in the beer, is carried out in a closed vessel. Upon completion of the fermentation, the beverage product is obtained by filtration.

The proteolytic enzyme acts to accelerate the decomposition of the plant protein and the malt has the same ability. These two materials can thus be used individually or in combination; moreover, proteolytic enzyme can be omitted when a correspondingly large amount of malt is used.

The materials used in the present process are as follows.

Per kiloliter of beverage product:  Kilograms
    Malt _____ 35 to 150
    Refined starch (or cereals) _____ 0 to 41.5
    Plant protein _____ 12 to 35
    Proteolytic enzyme _____ 0 to 0.7
    Hops _____ 1.27 to 2.13

The malt is preferably obtained from barley in per se known manner, although other grain may be used as the malt source. The process is essentially as follows: the starchy material, either barley, wheat, rye, corn, oats, rice or potatoes, is allowed to germinate so that its constituents may be made more soluble and suitable for fermentation. This is accomplished by first steeping the material in cold water; secondly, couching it on a dry floor; thirdly, flooring it to stop germination by turning over and over at a reduced temperature, and finally kiln-drying at a temperature of 90 to 400° Fahrenheit.

The starch source may preferable be rice because of the high starch content of the latter; however other starchy cereals may also be used, e.g. corn-starch, arrow-root-starch, refined starch, etc.

The plant protein may be e.g. wheat protein or gluten, rye protein, naked barley protein, etc.

The following examples set forth presently are preferred illustrative embodiments of the process of the invention. Parts are by weight unless otherwise indicated. The relationship of parts by weight to parts by volume is the same as that between grams and milliliters. Percentages are by weight. Temperatures are in degrees centigrade.

*Example 1*

33.4 parts of rice and 27.5 parts of wheat protein (e.g. Hi-Pro Gluten, Shinshin Shokuryo Co., Tokyo, Japan) are ground and mixed with 1200 parts by volume of water. This mash is boiled until it assumes a paste form. After cooling, 97.5 parts of malt and 0.28 part of proteolytic enzyme (e.g. Pronase AS. Kaken Kagaku Co., Ltd. Tokyo, Japan) are added to the mash paste, and hydrolysis and saccharification are then carried out, while stirring thoroughly. The protein hydrolysis is effected by stirring the mixture at 40–60° C. for an hour, and then the starch saccharification is carried out by continued stirring at 55–85° for 3 hours. The resultant mash is boiled with 1.7 parts of hops for 1½ hours. The mash is then filtered and washed. 1000 parts by volume of wort is thus obtained. The so-obtained wort is cooled and then subjected to fermentation by inoculating with 100 parts of volume of bottom-type fermentation yeast.

The first stage of the fermentation is carried out at 8 to 14° for ten days. The second stage fermentation which is a gradual fermentation is then carried out at 1 to 5° in a closed tank for 60 days, during which time carbonic acid is dissolved in the beverage. The brew is then cooled to 0 to −1° and filtered to yield the beverage product.

The compositions of the wort and product according to this process are as follows:

|  | Wort | Product |
|---|---|---|
| pH | 5.7 | 4.3 |
| Balling's reading | 12.0 | 3.3 |
| Total sugar content, percent | 11.2 |  |
| Reducing sugar content, percent | 9.6 | 0.8 |
| Alcohol content, percent |  | 4.2 |
| Protein content (as nitrogen), mg./100 ml | 10.2 | 1.2 |
| Peptide content (as nitrogen), mg./100 ml | 45.4 | 44.7 |
| Amino acids content (as nitrogen), mg./100 ml | 58.3 | 32.6 |
| Total nitrogen, mg./100 ml | 112.5 | 78.8 |

The bottom-fermenting yeast is *Saccharomyces cerevisiae* Hansen. However, *Saccharomyces monacensis* or other bottom-fermenting beer yeast may also be used.

The malt used in this and the other examples is that obtained from barley.

Other proteolytic enzymes which may be employed than that recited in the example are .e.g. pepsin, trypsin and the like.

*Example 2*

30 parts of wheat protein are mixed with 1200 parts by volume of water, and the mixture boiled. After cooling to 55°, 110 parts of malt are thoroughly stirred into the mash. Hydrolysis of the protein is then effected by heating the mixture at 40–60° C. for one hour. Saccharification of the mash is then carried out by stirring the mash at 55 to 85° for 3 hours, following which the mash is boiled with 1.7 parts of hops. The mash is then filtered and washed, 950 parts by volume of wort being obtained. The wort is cooled and then subjected to fermentation after the manner set forth in Example 1.

The compositions of the wort and product obtained according to the present example are as follows:

|  | Wort | Product |
|---|---|---|
| pH | 5.7 | 4.3 |
| Balling's reading | 11.9 | 3.3 |
| Total sugar content, percent | 11.6 | |
| Reducing sugar content, percent | 9.8 | 0.9 |
| Alcohol content, percent | | 4.3 |
| Protein content (as nitrogen), mg./100 ml | 10.1 | 1.0 |
| Peptide content (as nitrogen), mg./100 ml | 46.0 | 45.3 |
| Amino acids content (as nitrogen), mg./100 ml | 58.8 | 33.1 |
| Total nitrogen, mg./100 ml | 113.2 | 78.9 |

The alternatives recited at the end of Example 1 also apply here as well as to all the other examples.

*Example 3*

The mixture of proteins from rye and from naked barley (20 parts by weight of each protein) is boiled with 1200 parts by volume of water. After cooling to 55°, 97.5 parts of malt and 0.28 part of proteolytic enzyme (e.g. any one of those disclosed in Example 1) are thoroughly stirred into the mash. Hydrolysis of the protein is then effected at 40–60° C. for one hour, after which saccharification of the mash is carried out at 55 to 85° for 3 hours. The mash is then boiled with 1.7 parts of hops. The mash is filtered and washed, 1000 parts by volume of wort being thus obtained. The wort is cooled and then subjected to fermentation after the manner set forth in Example 1.

The compositions of the wort and product obtained according to the present example are as follows:

|  | Wort | Product |
|---|---|---|
| pH | 5.7 | 4.3 |
| Balling's reading | 12.6 | 3.5 |
| Total sugar content, percent | 11.4 | |
| Reducing sugar content, percent | 9.9 | 0.9 |
| Alcohol content, percent | | 4.3 |
| Protein content (as nitrogen), mg./100 ml | 10.8 | 1.4 |
| Peptide content (as nitrogen), mg./100 ml | 49.3 | 45.3 |
| Amino acids content (as nitrogen), mg./100 ml | 58.8 | 32.9 |
| Total nitrogen, mg./100 ml | 118.7 | 78.7 |

*Example 4*

The procedure according to Example 3 is carried out, except that the quantity of malt employed is increased to 110 parts.

The compositions of the resultant wort and beverage product are as follows:

|  | Wort | Product |
|---|---|---|
| pH | 5.7 | 4.3 |
| Balling's reading | 12.2 | 3.5 |
| Total sugar content, percent | 11.8 | |
| Reducing sugar content, percent | 9.7 | 0.9 |
| Alcohol content, percent | | 4.3 |
| Protein content (as nitrogen), mg./100 ml | 10.5 | 1.2 |
| Peptide content (as nitrogen), mg./100 ml | 46.2 | 45.5 |
| Amino acids content (as nitrogen), mg./100 ml | 58.5 | 33.2 |
| Total nitrogen, mg./100 ml | 115.0 | 79.3 |

*Example 5*

27.5 parts of wheat protein, 0.28 part of proteolytic enzyme (any one of those used in Example 1) and 200 parts by volume of water are mixed. The mixture is thoroughly stirred 40–60° C. until hydrolysis of the protein is realized. Separately, 1000 parts by volume of water and 33.4 parts of ground rice are mixed and boiled while being thoroughly stirred. After cooling, 97.5 parts of malt are added to the latter mixture, following which saccharification is effected at 55 to 85° for 3 hours. The two mashes are admixed and boiled with 1.7 parts of hops for 1½ hours. The mixed mash is then filtered and washed after which the resulting wort is treated after the manner described in Example 1.

The compositions of the so-obtained wort and beverage product are as follows:

|  | Wort | Product |
|---|---|---|
| pH | 5.8 | 4.3 |
| Balling's reading | 12.2 | 3.3 |
| Total sugar content, percent | 11.3 | |
| Reducing sugar content, percent | 9.8 | 0.8 |
| Alcohol content, percent | | 4.1 |
| Protein content (as nitrogen), mg./100 ml | 10.2 | 1.3 |
| Peptide content (as nitrogen), mg./100 ml | 45.9 | 44.5 |
| Amino acids content (as nitrogen), mg./100 ml | 58.5 | 33.0 |
| Total nitrogen, mg./100 ml | 113.2 | 79.2 |

*Example 6*

30 parts of naked barley protein, 0.28 part of proteolytic enzyme (e.g. any one set forth in Example 1) and 200 parts by volume of water are mixed. The mixture is subjected to hydrolysis by stirring thoroughly 40–60° C. Separately, 33.4 parts of ground rice and 1000 parts by volume of water are mixed and boiled. After cooling the latter mixture, 97.5 parts of malt are added thereto, followed by saccharification at 55–85° for 3 hours. The two mashes thus obtained are admixed and boiled with hops as in the preceding example, the further prescriptions of which are then also followed.

The compositions of the obtained wort and beverage product are as follows:

|  | Wort | Product |
|---|---|---|
| pH | 5.8 | 4.2 |
| Balling's reading | 12.4 | 3.4 |
| Total sugar content, percent | 11.2 | |
| Reducing sugar content, percent | 9.7 | 0.8 |
| Alcohol content, percent | | 4.1 |
| Protein content (as nitrogen), mg./100 ml | 10.3 | 1.3 |
| Peptide content (as nitrogen), mg./100 ml | 44.8 | 43. |
| Amino acids content (as nitrogen), mg./100 ml | 57.7 | 32.6 |
| Total nitrogen, mg./100 ml | 110.8 | 78.6 |

*Example 7*

20 parts of naked barley protein, 10 parts of wheat protein, 0.28 part of proteolytic enzyme (e.g. one disclosed in Example 1) and 200 parts of volume of water are mixed. This mash is subjected to hydrolysis. Separately 33.4 parts of ground rice and 1000 parts by volume of water are mixed and boiled. After cooling the latter mash, 97.5 parts of malt is added to it and saccharification is carried out under the same conditions as in Example 5. The two mashes are mixed and boiled with hops. The further procedure is the same as in Example 1.

The compositions of the resultant wort and the product are as follows:

|  | Wort | Product |
|---|---|---|
| pH | 5.7 | 4.3 |
| Balling's reading | 12.2 | 3.2 |
| Total sugar content, percent | 11.5 | |
| Reducing sugar content, percent | 9.5 | 0.7 |
| Alcohol content, percent | | 4.2 |
| Protein content (as nitrogen), mg./100 ml | 10.1 | 1.3 |
| Peptide content (as nitrogen), mg./100 ml | 45.1 | 44.2 |
| Amino acids content (as nitrogen), mg./100 ml | 58.0 | 32.8 |
| Total nitrogen, mg./100 ml | 112.8 | 78.8 |

*Example 8*

60 parts of fresh wheat gluten dough, 0.28 part of proteolytic enzyme (cf. Example 1) and 200 parts by volume of water at 50° are mixed. This mash is subjected to hydrolysis. Separately, 33.4 parts of ground rice and 1000 parts of water are mixed. The latter mash is boiled. After cooling the latter mash, 97.5 parts of malt are added and saccharification is carried out. Then, the two mashes are mixed and boiled with hops. The further procedure is the same as Example 1.

The compositions of the wort and the product are as follows:

|  | Wort | Product |
|---|---|---|
| pH | 5.7 | 4.2 |
| Balling's reading | 12.0 | 3.2 |
| Total sugar content, percent | 11.1 | |
| Reducing sugar content, percent | 9.7 | 0.8 |
| Alcohol content, percent | | 4.1 |
| Protein content (as nitrogen), mg./100 ml | 10.1 | 1.3 |
| Peptide content (as nitrogen), mg./100 ml | 45.3 | 44.2 |
| Amino acids content (as nitrogen), mg./100 ml | 58.2 | 33.2 |
| Total nitrogen, mg./100 ml | 112.9 | 79.0 |

*Example 9*

30 parts of ground rice, 40 parts of naked barley flour, 40 parts of wheat flour and 1000 parts by volume of water are mixed and boiled with thorough stirring. After cooling to 50°, 97.5 parts of malt and 0.28 part of proteolytic enzyme (cf. Example 1) are added. The mash is subjected to protein hydrolysis 40–60° C., and starch saccharification at 55 to 85°. The mash is then boiled with hops. The further procedure is the same as in Example 1.

The compositions of the wort and the beverage product are as follows:

|  | Wort | Product |
|---|---|---|
| pH | 5.9 | 4.4 |
| Balling's reading | 12.3 | 3.5 |
| Total sugar content, percent | 12.0 | |
| Reducing sugar content, percent | 9.9 | 0.9 |
| Alcohol content, percent | | 4.3 |
| Protein content (as nitrogen), mg./100 ml | 10.3 | 1.2 |
| Peptide content (as nitrogen), mg./100 ml | 46.8 | 45.3 |
| Amino acids content (as nitrogen), mg./100 ml | 59.1 | 33.5 |
| Total nitrogen, mg./100 ml | 114.3 | 79.2 |

What is claimed is:

1. A method for producing alcoholic malt beverage which comprises mixing starch and plant protein with water, boiling the resulting mash, adding malt and proteolytic enzyme to the mash, subjecting the mash first to a temperature of 40° to 60° C. until hydrolysis of the protein has been effected, then raising the temperature to 55–85° C. until saccharification of the starch has been effected, boiling the hydrolysis mixture-containing mash with hops, and fermenting the resultant wort and with bottom-fermenting yeast.

2. A method for producing alcoholic malt beverage which comprises boiling a mixture of plant protein and water, cooling the mixture, adding malt to the mixture, subjecting the mixture first to a temperature of 40° to 60° C. until protein hydrolysis is realized and then raising the temperature to 55–85° C. until saccharification is achieved, boiling the mixture with hops, and fermenting the resultant wort with bottom-fermenting yeast.

3. A method for producing alcoholic malt beverage which comprises boiling a mixture of plant protein and water, cooling the mixture, adding malt and proteolytic enzyme to the mixture, subjecting the mixture first to a temperature of 40° to 60° C. until protein hydrolysis is realized and then raising the temperature to 55–85° C. until saccharification is achieved, boiling the hydrolysis mixture with hops, and fermenting the resultant wort with bottom-fermenting yeast.

4. A method for producing alcoholic malt beverage which comprises mixing plant protein, proteolytic enzyme and water, hydrolysing the protein by heating to 40–60° C., separately mixing starch and water, boiling the latter mixture, adding malt to the latter mixture, hydrolysing starch in the latter mixture by heating to 55–85° C., combining the two mixtures, boiling the combined mixture with hops, and fermenting the resultant wort with bottom-fermenting yeast.

5. A method according to claim 1 wherein the source of starch is at least one member selected from the group consisting of refined starch, rice, naked barley and wheat.

6. A method according to claim 4, wherein the source of starch is at least one member selected from the group consisting of refined starch, rice, naked barley and wheat.

7. A method according to claim 1, wherein the source of protein is at least one member selected from the group consisting of naked barley, wheat and rye.

8. A method according to claim 4, wherein the source of protein is at least one member selected from the group consisting of naked barley, wheat and rye.

References Cited by the Examiner

UNITED STATES PATENTS

| 220,023 | 9/1879 | Hartshorn | 99—43 |
| 303,141 | 8/1884 | Feroe | 99—43 |
| 466,151 | 12/1891 | Billings | 99—43 |
| 1,235,882 | 8/1917 | Defren | 99—31 |
| 1,995,275 | 3/1935 | Heuser | 99—31 |

A. LOUIS MONACELL, *Primary Examiner.*

D. M. STEPHENS, *Assistant Examiner.*